United States Patent [19]
Wada et al.

[11] Patent Number: 5,621,493
[45] Date of Patent: Apr. 15, 1997

[54] PHOTOGRAPHIC CAMERA WITH SHIFTING CARTRIDGE HOLDER

[75] Inventors: Shigeru Wada, Kishiwada; Michihiro Iwata, Sakai; Manabu Inoue, Kobe; Sadafusa Tsuji, Tondabayashi, all of Japan

[73] Assignee: Minolta Camera Kabushiki Kaisha, Osaka, Japan

[21] Appl. No.: 309,548

[22] Filed: Sep. 20, 1994

Related U.S. Application Data

[63] Continuation of Ser. No. 88,408, Jun. 3, 1993, abandoned, which is a continuation of Ser. No. 734,171, Jul. 22, 1991, abandoned.

[30] Foreign Application Priority Data

| Jul. 23, 1990 | [JP] | Japan | 2-196935 |
| Aug. 13, 1990 | [JP] | Japan | 2-214709 |

[51] Int. Cl.⁶ ........................................ G03B 17/02
[52] U.S. Cl. ............................. 396/538; 396/387
[58] Field of Search ........................ 354/174, 288, 354/173.1, 173.11, 149.11, 212, 214, 275

[56] References Cited

U.S. PATENT DOCUMENTS

| 2,592,158 | 4/1952 | Kirby et al. | 354/275 X |
| 4,363,547 | 12/1982 | Hashimoto et al. | 354/212 |
| 4,474,443 | 10/1984 | Komatsuzaki et al. | 354/212 |
| 4,516,843 | 5/1985 | Ohmura | 354/173.1 |
| 4,647,170 | 3/1987 | Stoneham | 354/275 |
| 4,669,845 | 6/1987 | Ishiguro et al. | 354/288 |
| 4,841,319 | 6/1989 | Hansen | 354/275 |
| 4,860,041 | 8/1989 | Harvey | 354/212 |
| 4,903,061 | 2/1990 | Harvey | 354/213 |

FOREIGN PATENT DOCUMENTS 2-113230  4/1990  Japan.

*Primary Examiner*—Howard B. Blankenship
*Attorney, Agent, or Firm*—Burns, Doane, Swecker & Mathis, LLP

[57] ABSTRACT

A photographic camera includes a camera body, a cartridge holder, and a shift device. The cartridge holder is capable of holding a film cartridge to be used in the photographic camera, and movable between a first position in which the film cartridge can be removed from the camera and a second position in which the film cartridge can be used in the photographic camera. The second position is aligned to the first position. The shift device shifts the cartridge holder between the first and second positions. The camera also can include a flash device, having a flashlight emitting portion, for illuminating an object to be photographed by a flash light. The camera further can include a device for determining a position of the film cartridge with respect to the camera body the cartridge holder is located at the second position.

21 Claims, 10 Drawing Sheets

PHOTOGRAPHIC CAMERA WITH SHIFTING CARTRIDGE HOLDER

This application is a continuation, of application Ser. No. 08/088,408, filed Jun. 3, 1993, which is a continuation of application Ser. No. 07/734,171, filed Jul. 22, 1991, both abandoned.

BACKGROUND OF THE INVENTION

1. Field of the Invention

The present invention relates to a camera in which after a film cartridge is loaded into a cartridge holder, the holder is accommodated in the camera body.

2. Description of the Related Art

Heretofore, a camera of type in which a film cartridge is loaded in the camera body by dropping it into a cartridge chamber of the camera body, is known.

In this type of camera, there is a possibility that a photographer mistakes the cartridge chamber for a battery chamber, i.e., a photographer may open the cover of the cartridge chamber. As a result, the film cartridge drops from the camera body.

It is known that in a camera of the above type, a film cartridge is loaded into the camera body from the bottom portion of the camera body. If a tripod is mounted on the bottom portion of the camera, it is difficult to load the film cartridge into the cartridge chamber or take it out therefrom. It is also known that the cover of a cartridge chamber is formed on the upper surface of the camera body. In this case, it is difficult to mount parts such as a flashlight emitting device on the upper surface of the cartridge chamber.

Further, in a type of camera, a film accommodated in the cartridge is fed out therefrom by rotating the film winding shaft of the cartridge in the film loosening direction. In this type of camera, it is necessary to align the film passing slit of the cartridge with the film tunnel in the camera body with high accuracy. If the former is not aligned with the latter, the torque of the film winding shaft during feeding of the film is increased. As a result, a film loading problem occurs.

In particular, in the camera in which the cartridge is loaded into the cartridge holder by dropping the cartridge thereinto, it is difficult to align the film passing slit with the film tunnel because the cartridge holder is interposed between the cartridge and the camera body. Moreover, in this type of camera, the side face of the cartridge holder is exposed to the outside. Therefore, when external force is applied to the side surface of the cartridge, there is a possibility that the film is shaken or the face of the film is not kept straight.

SUMMARY OF THE INVENTION

It is an object of the present invention to provide a camera having a film loading mechanism provided in the bottom portion of the camera body and facilitating the loading of a film cartridge into a cartridge chamber casing without having the photographer mistake the cover of a battery chamber for the cover of the cartridge chamber casing.

It is another object of the present invention to provide a camera, having a film loading mechanism facilitating the loading of a film cartridge into a cartridge chamber casing, in which there is no possibility that the film cartridge drops from the camera body by opening the cover of the cartridge chamber casing by mistaking the cover of a battery chamber for the cover of the cartridge chamber casing.

It is still another object of the present invention to provide a camera, having a film loading mechanism facilitating the loading of a film cartridge into a cartridge chamber casing, in which the film passing slit of the film cartridge is accurately aligned with the film tunnel of the camera body.

It is a further object of the present invention to provide a camera, having a film loading mechanism facilitating the loading of a film cartridge into a cartridge chamber casing, in which the film passing slit of the film cartridge is accurately aligned with the film tunnel of the camera body even though external force is applied to the camera body.

In accomplishing these and other objects, according to one aspect of the present invention, there is provided a photographic camera comprising:

a camera body;

a cartridge holder capable of holding a film cartridge to be used in said photographic camera, and movable between a first position in which said film cartridge can be removed from said camera and a second position in which said film cartridge can be used in said photographic camera, said second position being aligned to said first position; and means for shifting said cartridge holder between said first and second positions.

According to another aspect of the present invention, there is provided a photographic camera comprising:

a camera body;

flash means, having a flashlight emitting portion, for illuminating an object to be photographed by a flash light;

a cartridge holder capable of holding a film cartridge to be used in said photographic camera, and movable between a first position in which said film cartridge can be removed from said camera and a second position in which said film cartridge can be used in said photographic camera, said second position being disposed below said flashlight emitting portion; and means for shifting said cartridge holder between said first and second positions.

According to a further aspect of the present invention, there is provided a photographic camera comprising:

a camera body;

a cartridge holder capable of holding a film cartridge to be used in said photographic camera, and movable between a first position in which said film cartridge can be removed from said camera and a second position in which said film cartridge can be used in said photographic camera;

means for shifting said cartridge holder between said first and second positions; and means for determining a position of said film cartridge with respect to said camera body when the cartridge holder is located at said second position.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Figure 1:
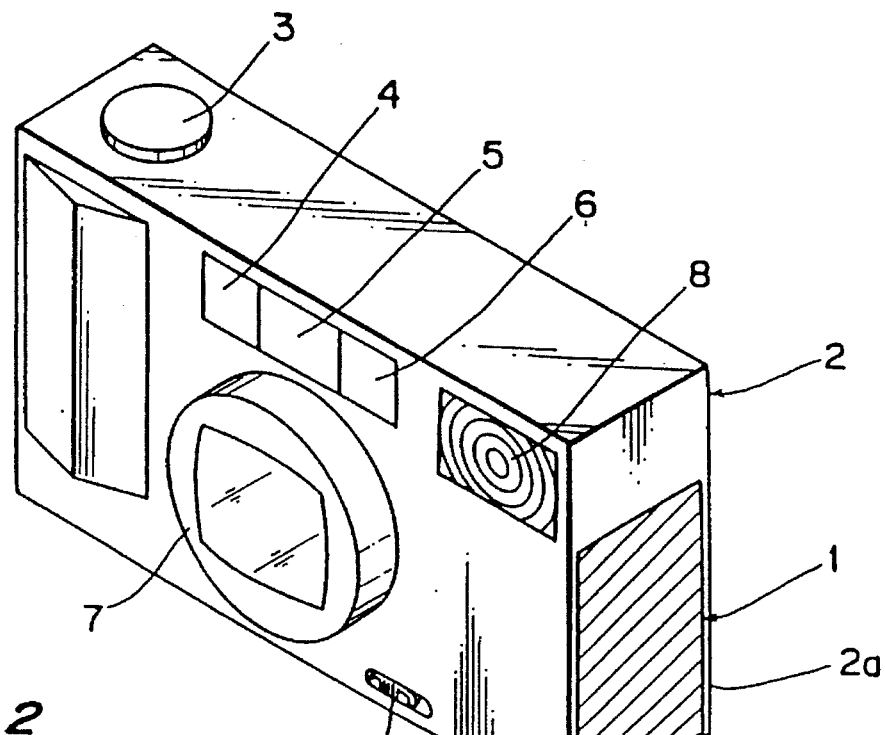
FIG. 1 is a perspective view showing a camera, having a cartridge loading device according to an embodiment of the present invention, in which a cartridge chamber casing is accommodated in the camera body.

Before the description of the present invention proceeds, it is to be noted that like parts are designated by like reference numerals throughout the accompanying drawings.

Figure 2:
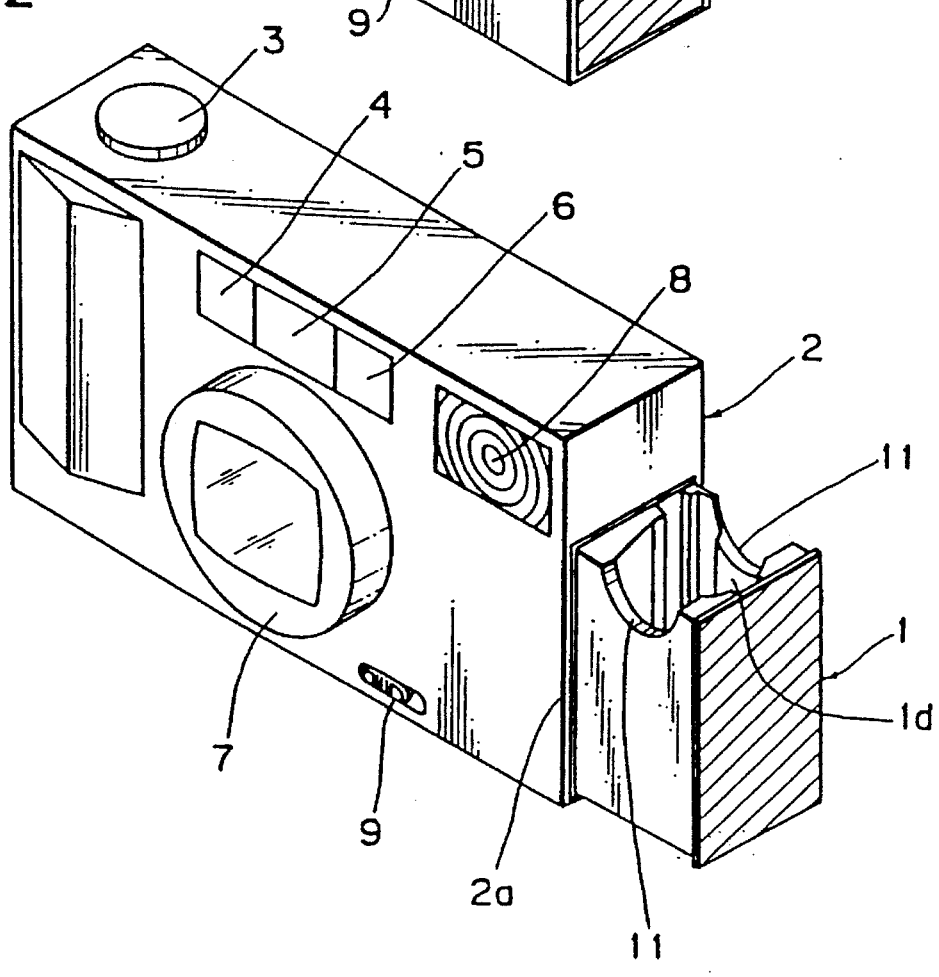
FIG. 2 is a perspective view showing the camera, having the cartridge loading device according to the embodiment of the present invention, in which a cartridge chamber casing projects from the camera body.

Referring to FIGS. 1 and 2, a photographic camera according to an embodiment of the present invention is described below. The camera uses the above-explained type film cartridge. The camera adopts the above-explained drop-in method, i.e., a film cartridge 10 is axially dropped into a cartridge chamber casing 1 serving as a cartridge holder. Conventionally, the opening cover of the cartridge chamber casing is removed to load the film cartridge thereinto through its opening. According to the embodiment, the cartridge chamber casing 1 projects from a camera body 2 to load the film cartridge 10 into the cartridge chamber casing 1 from its opening.

FIGS. 1 and 2 are external views showing the camera according to the embodiment. FIG. 1 shows the condition in which the cartridge chamber casing 1 is accommodated in the camera body 2. FIG. 2 shows the condition in which the cartridge chamber casing 1 projects therefrom. The camera has a shutter release button 3 provided on the upper surface of the camera body 2. The camera further has in the front surface thereof an automatic focusing (AF) light projecting window 4; a view finder window 5; an automatic focusing light receiving window 6; a lens barrel 7; a flashlight emitting device 8; and a button 9 for ejecting the cartridge chamber casing 1 from the camera body 2 to the outside. The camera further has an opening 2a for projecting the cartridge chamber casing 1 from the camera body 2 provided on the right side of the camera body 2.

The upper portions of the front and rear walls of the cartridge chamber casing 1 are cut to form circular grooves 11 so that the cartridge 10 accommodated therein can be gripped by hand easily.

Figure 3:
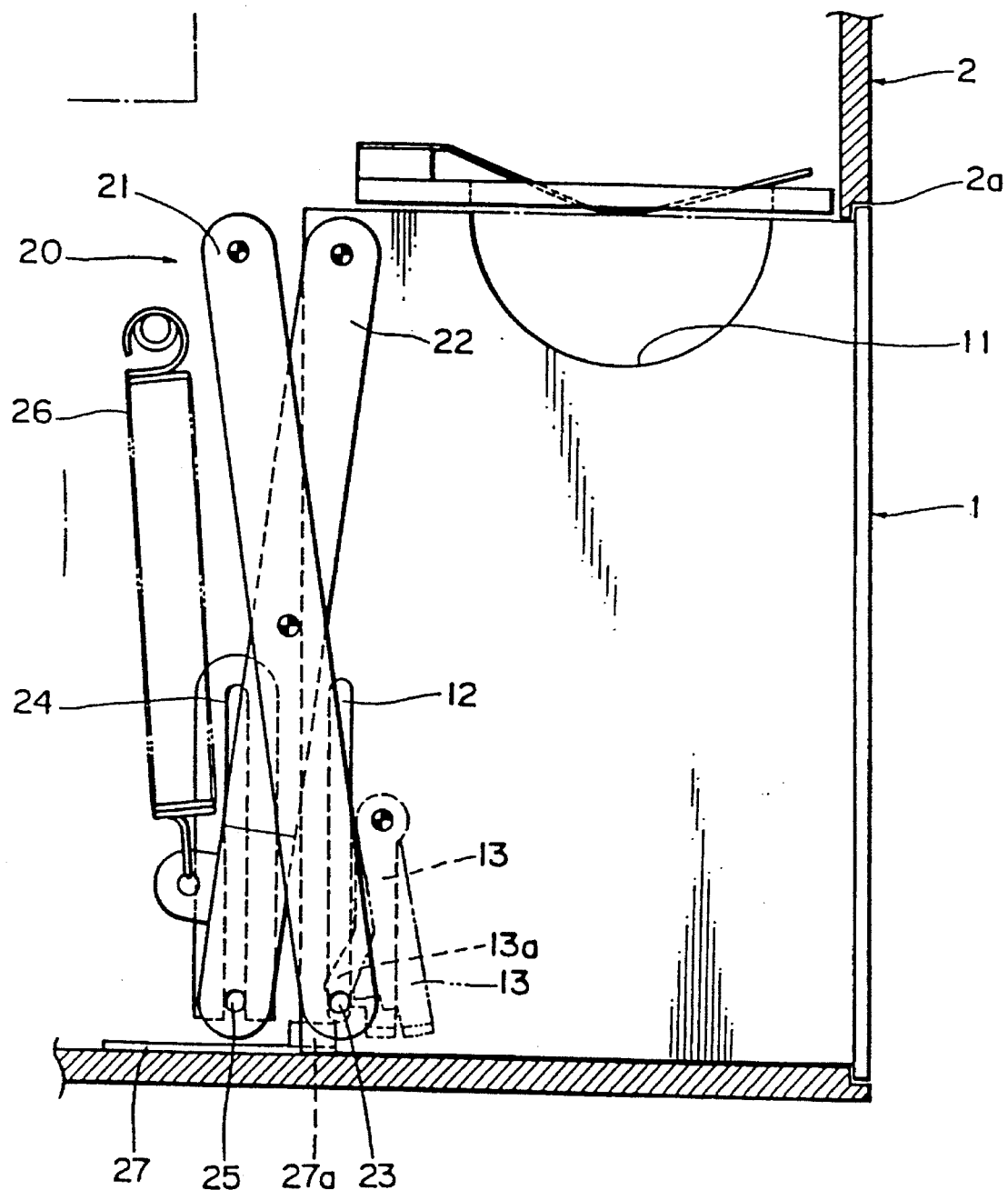
FIG. 3 is a descriptive view showing a linking mechanism in the condition in which the cartridge chamber casing is accommodated in the camera body.
Figure 4:
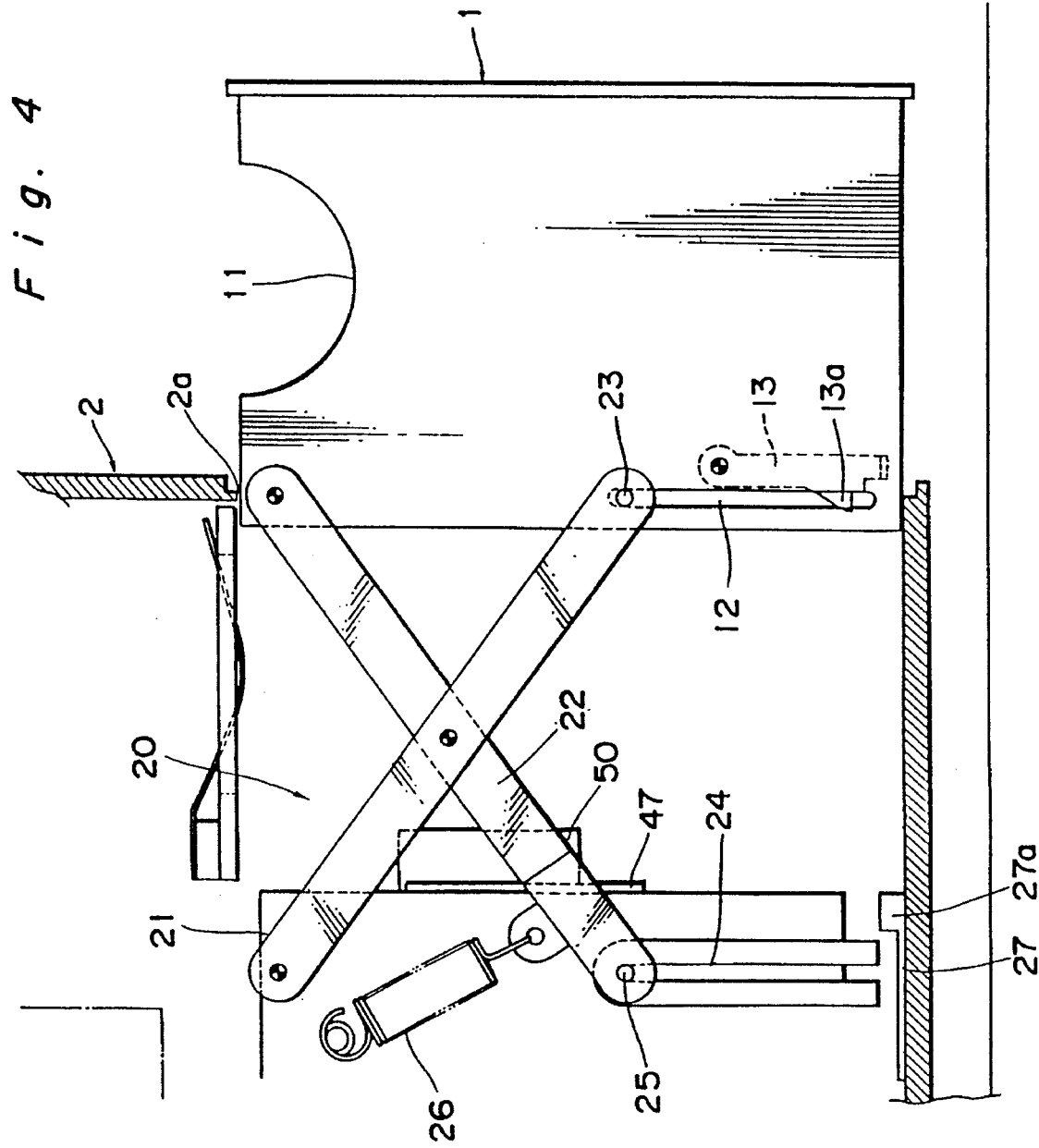
FIG. 4 is a descriptive view showing the linking mechanism in the condition in which the cartridge chamber casing projects from the camera body.

The mechanism for ejecting the cartridge chamber casing 1 from the camera body 2 is described with reference to FIGS. 3 and 4. The cartridge chamber casing 1 is hung from the camera body 2 by a linking mechanism 20 so that the cartridge chamber casing 1 is movable in the longitudinal direction of the camera body 2. FIG. 3 shows the cartridge chamber casing 1 accommodated in the camera body 2. FIG. 4 shows the cartridge chamber casing 1 projecting from the camera body 2. The linking mechanism 20 has two pairs of levers 21 and 22 positioned in the front wall and rear wall of the cartridge chamber casing 1. In other words, the cartridge chamber casing 1 is sandwiched by the two pairs of levers 21 and 22 so as to maintain the flexure/torsion strength of the cartridge chamber casing. 1 at a certain value when the cartridge chamber casing 1 projects from the camera body 2. One end of each of the first lever 21 is rotatably mounted on the camera body 2 at an upper end portion thereof, the center thereof is rotatably connected with the center of the second lever 22, and the other end thereof vertically movably engages with a pin 23 a cam groove 12 provided in the lower portion of the cartridge chamber casing 1 on the camera body side. One end of each of the second lever 22 is rotatably supported by the cartridge chamber casing 1 at an upper end portion thereof positioned on the camera body side of the cartridge chamber casing 1. The other end of the second lever 22 vertically movably engages with a pin 25 a cam groove 24 provided in the lower end portion of the camera body 2 on the cartridge chamber casing side. With the upward movement of the lower ends of the first and second levers 21 and 22 along the cam grooves 12 and 24, the cartridge chamber casing 1 hung by the linking mechanism 20 and positioned as shown in FIG. 3 projects from the right side of the camera body 2 as shown in FIG. 4. Each end, of the pair of the first levers 22, positioned on the camera body side is urged by a spring 26 toward the outside of the camera body 2.

When the cartridge chamber casing 1 is accommodated in the camera body 2, one of the pins 23 connecting the first levers 21 with the cam grooves 12 is locked by a claw 13a of a locking lever 13 rotatably supported by the cartridge chamber casing 1. The locking lever 13 is urged by a spring not shown to rotate in the direction in which the pin 23 is locked by the locking lever 13. In order to release the pin 23 from the locking lever 13, the ejecting button 9 of the cartridge chamber casing 1 is operated in the cartridge chamber casing ejecting direction so as to bring a projection 27a of a releasing lever 27 movable together with the ejecting button 9 into contact with the lower end of the locking lever 13. As a result, the locking lever 13 rotates counterclockwise as shown by the two-dot chain line in FIG. 3.

Figure 5:
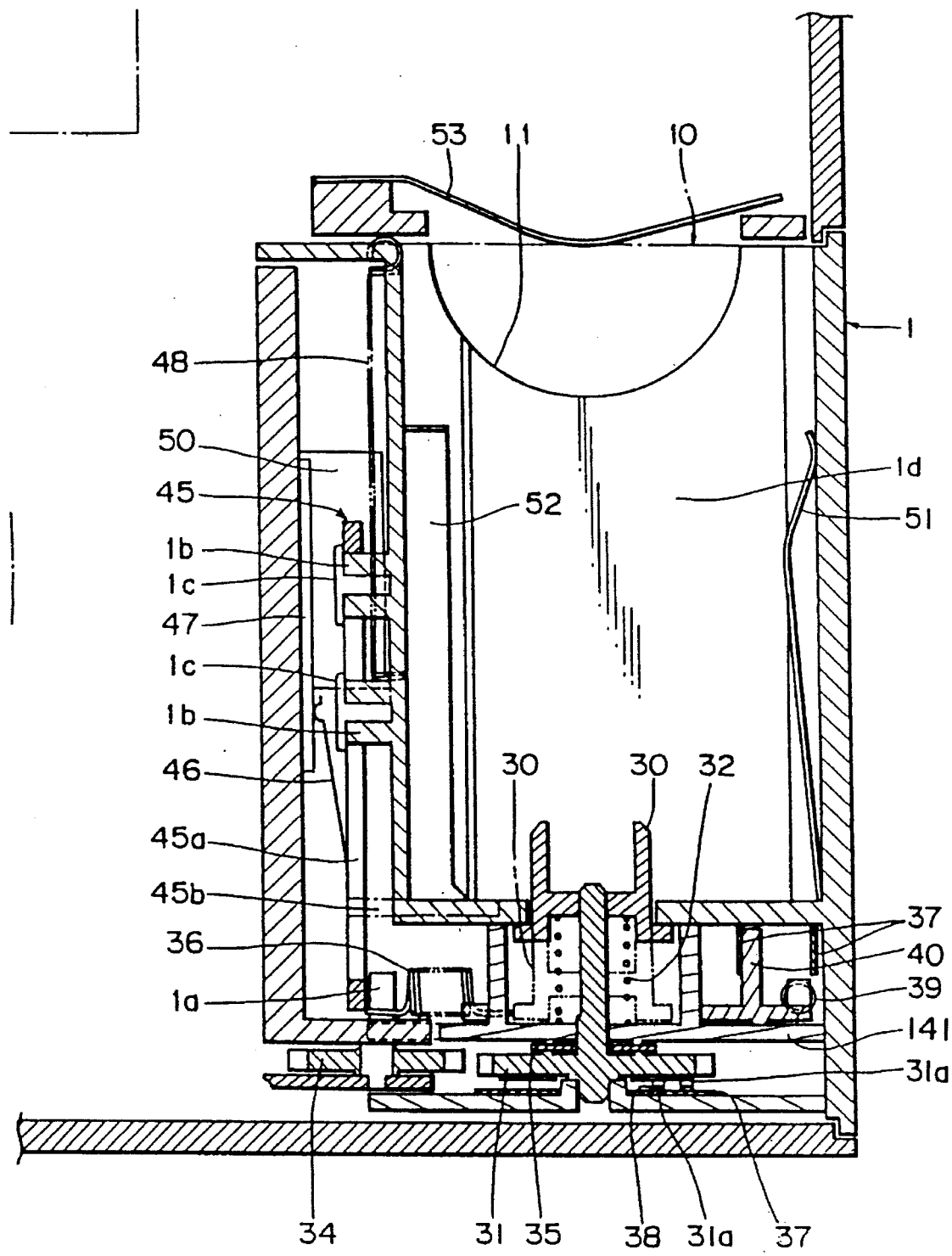
FIG. 5 is a longitudinal sectional view, of the camera body and the cartridge chamber casing, showing a mechanism for driving a fork in the condition in which the cartridge chamber casing is accommodated in the camera body.
Figure 6:
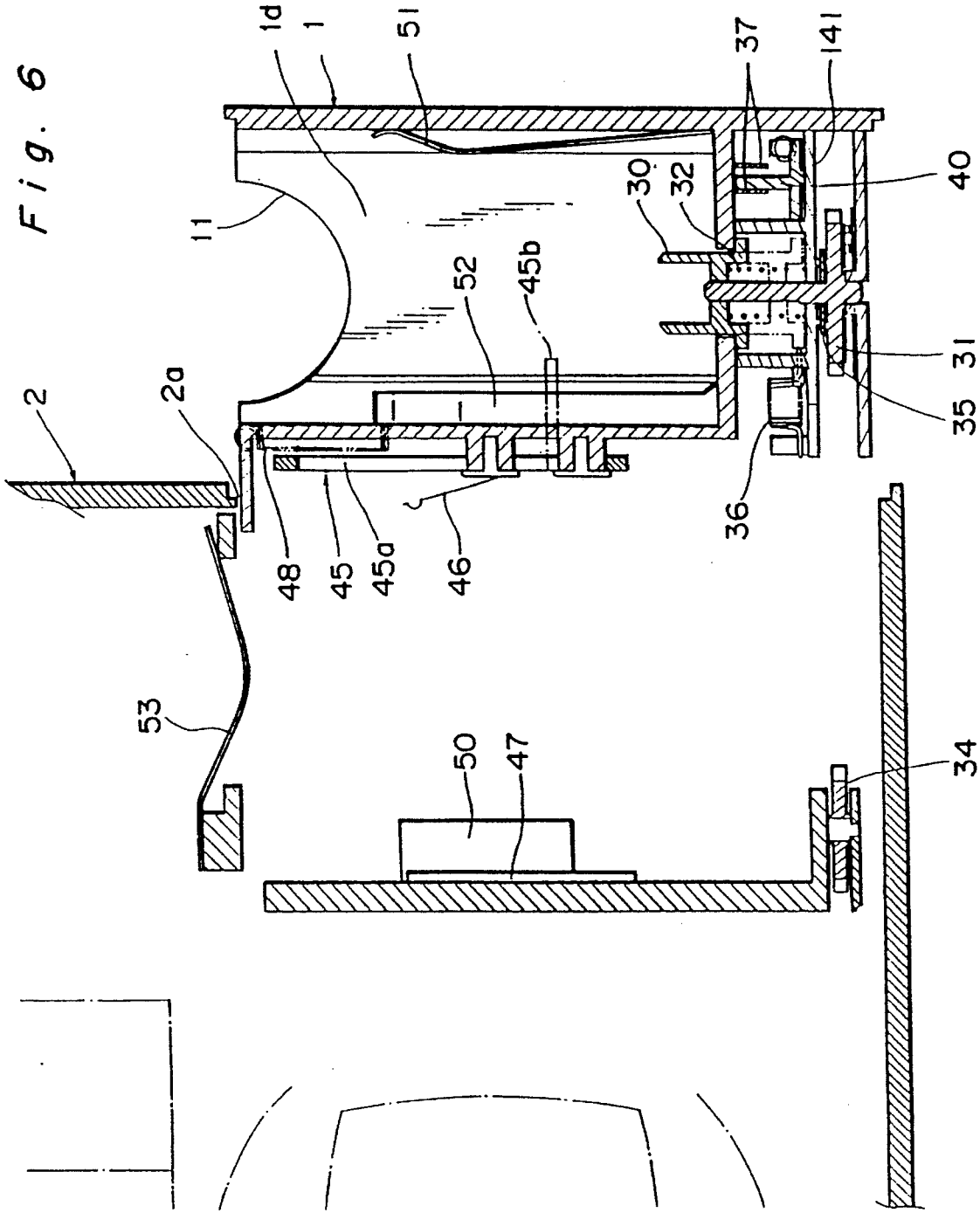
FIG. 6 is a longitudinal sectional view, of the camera body and the cartridge chamber casing, showing the mechanism for driving the fork in the condition in which the cartridge chamber casing projects from the camera body.
Figure 7:
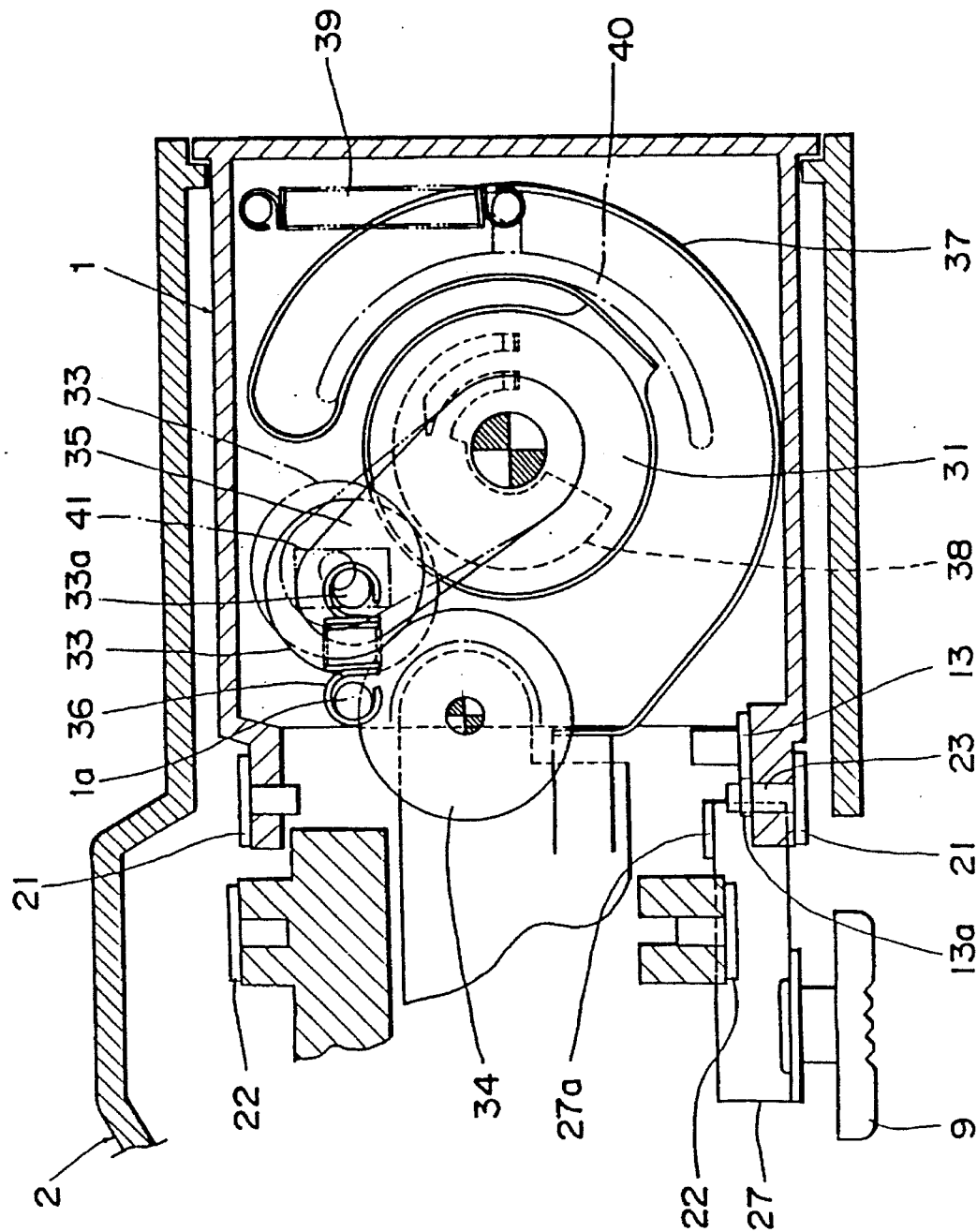
FIG. 7 is a transverse sectional view, of the camera body and the cartridge chamber casing, showing the mechanism for driving the fork in the condition in which the cartridge chamber casing is accommodated in the camera body.
Figure 8:
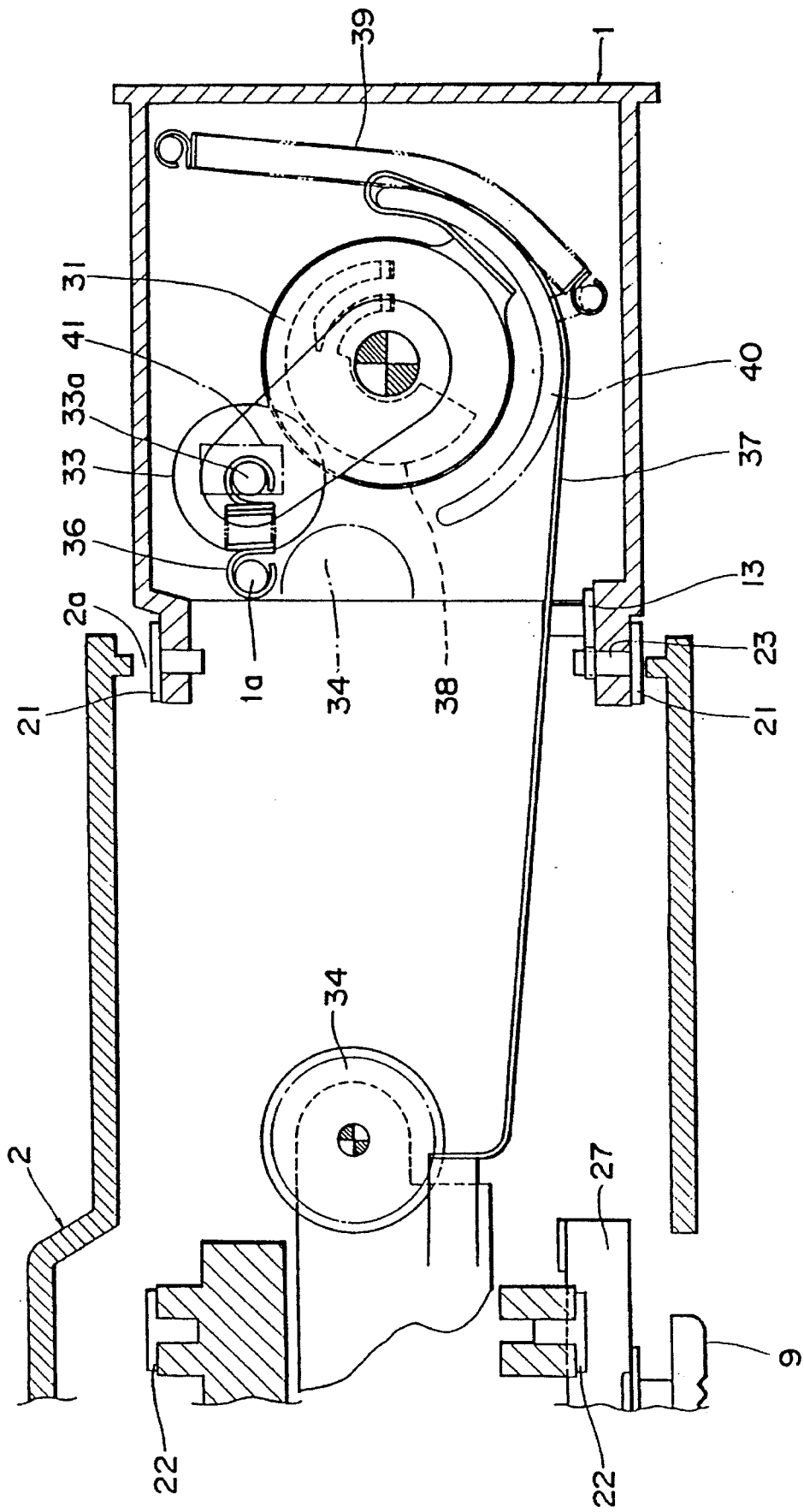
FIG. 8 is a transverse sectional view, of the camera body and the cartridge chamber casing, showing the mechanism for driving the fork in the condition in which the cartridge chamber casing projects from the camera body.

When the cartridge chamber casing 1 moves from the accommodation position to the projection position, a fork 30 for winding and rewinding a film and a part of the system for driving the fork 30 provided below the cartridge chamber casing 1 move together with the cartridge chamber casing 1 while the parts of the system are separated from each other to cut the driving path thereof as shown in FIGS. 5, 6, 7, and 8. FIGS. 5 and 7 show the cartridge chamber casing 1 accommodated in the camera body 2. FIGS. 6 and 8 show the cartridge chamber casing 1 projecting from the camera body 2. The fork 30 capable of engaging a spool 10a of the cartridge 10 is movable into and out of a cartridge accommodating chamber 1d of the cartridge chamber casing 1 by a spring 32 and rotatable together with a fork driving gear 31. A planetary gear 33 engages the fork driving gear 31 via a planetary plate 35. The planetary gear 33 is urged by a spring 36 to push toward the position at which in the cartridge chamber casing 1 the planetary gear 33 engages a driving gear 34 coupled with a driving device mounted on the camera body side thereof. When the cartridge chamber casing 1 is accommodated in the camera body 2, the planetary gear 33 can move away from the driving gear 34 against the urging force of the spring 36 if the planetary gear 33 engages the driving gear 34 inappropriately. The planetary gear 33 which has moved away from the driving gear 34 is pressed against the periphery of the driving gear 34 by the spring 36 provided between a shaft 33a of the planetary gear 33 and a projection 1a provided in the cartridge chamber casing 1. As a result, the planetary gear 33 engages the driving gear 34 appropriately immediately after the driving gear 34 starts rotating, thus transmitting the driving force of the driving gear 34 to the fork driving gear 31 via the planetary gear 33. The shaft 33a of the planetary gear 33 is inserted into an opening 41 of a regulating plate 141 positioned below the cartridge chamber casing 1. An inappropriate engagement between the planetary gear 33 and the driving gear 34 can be adjusted by the movement of the shaft 33a within the opening 41.

A pair of contacts 31a integrated with the lower surface of the fork driving gear 31 contact an encoder 38 mounted on a flexible substrate 37 opposed to the contacts 31a to monitor the position of the fork 30. The substrate 37 is electrically connected with a predetermined device in the camera body 2 when the cartridge chamber casing 1 projects from the camera body 2 as well as it is accommodated in the camera body 2. That is, when the cartridge chamber casing 1 is at the accommodation position, a looseness absorbing member 40 which is rotatably provided in the periphery of the move-away position of the fork 30 winds a loosened portion of the substrate 37 around the member 40. More specifically, the looseness absorbing member 40 is urged to move counterclockwise by a spring 39 so as to wind the loosened portion of the substrate 37 around both surfaces thereof.

The cartridge chamber casing 1 has a rectangular frame-configured ISO detecting member 45 slidable in the cartridge loading direction. Projections 1b of the cartridge chamber casing 1 are inserted into an opening 45a of the ISO detecting member 45. Thus, the ISO detecting member 45 is held by pins 1c so that the member 45 is movable in the cartridge loading direction and urged by a spring 48 in the cartridge ejecting direction. The ISO detecting member 45 has an arm 45b which projects into the cartridge chamber casing 1. When the cartridge 10 is loaded into the cartridge chamber casing 1, the arm 45b contacts a film sensitivity detecting rib of the cartridge 10. As a result, the ISO detecting member 45 is pressed downward, namely, in the cartridge loading direction together with the cartridge 10. The ISO detecting member 45 has a pair of contacts 46. When the pair of contacts 46 of the ISO detecting member 45 contacts an encoder substrate 47 provided in the camera body 2 and opposed to the ISO detecting member 45, the encoder of the encoder substrate 47 electrically reads the sensitivity of the film contained in the cartridge 10 and detects that the cartridge chamber casing 1 has been accommodated in the camera body 2.

Figure 11:
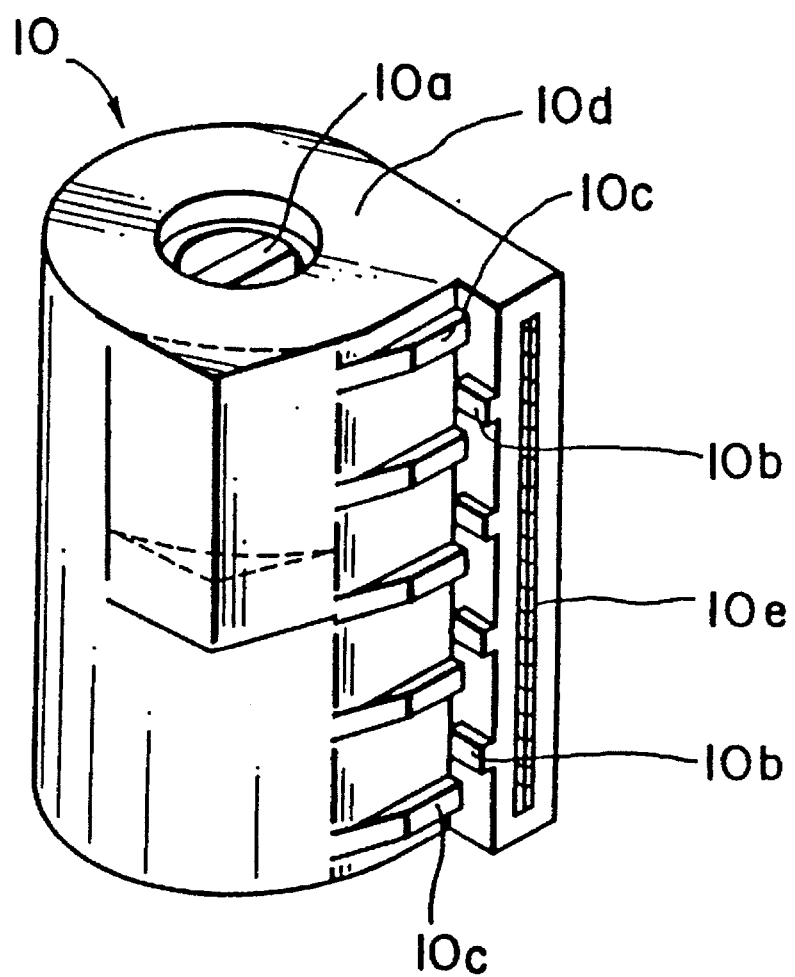
FIG. 11 is perspective view shoving the cartridge viewed from the bottom portion thereof.

Referring to FIG. 11 showing the external appearance of a cartridge to be used by the camera according to the embodiment. The cartridge 10 is made of plastic material. The film not shown is wound and rewound by rotating the spool 10a of the cartridge 10. In order to position the cartridge 10 in a predetermined position and posture in the cartridge chamber casing 1, the cartridge 10 has first, second, and third positioning reference faces 10b, 10c, and 10d formed in the vicinity of a film passing slit 10e. The first reference face 10b is formed on a side of the projection having the film passing slit 10e, so that the cartridge 10 is parallel with the film face. The second reference face 10c is formed on the side face of the cartridge 10 such that the second reference face 10c is adjacent to the first reference face 10b and perpendicular to the first reference face 10b so that the cartridge 10 is perpendicular to the film face. The function of the third reference face 10d which is a bottom surface of the cartridge 10 is to position the cartridge 10 to be parallel with the axial direction of the spool 10a. A V-shaped portion adjacent to the second reference face 10c is formed on the casing of the cartridge 10 so as to indicate a film exposure index.

Figure 9:
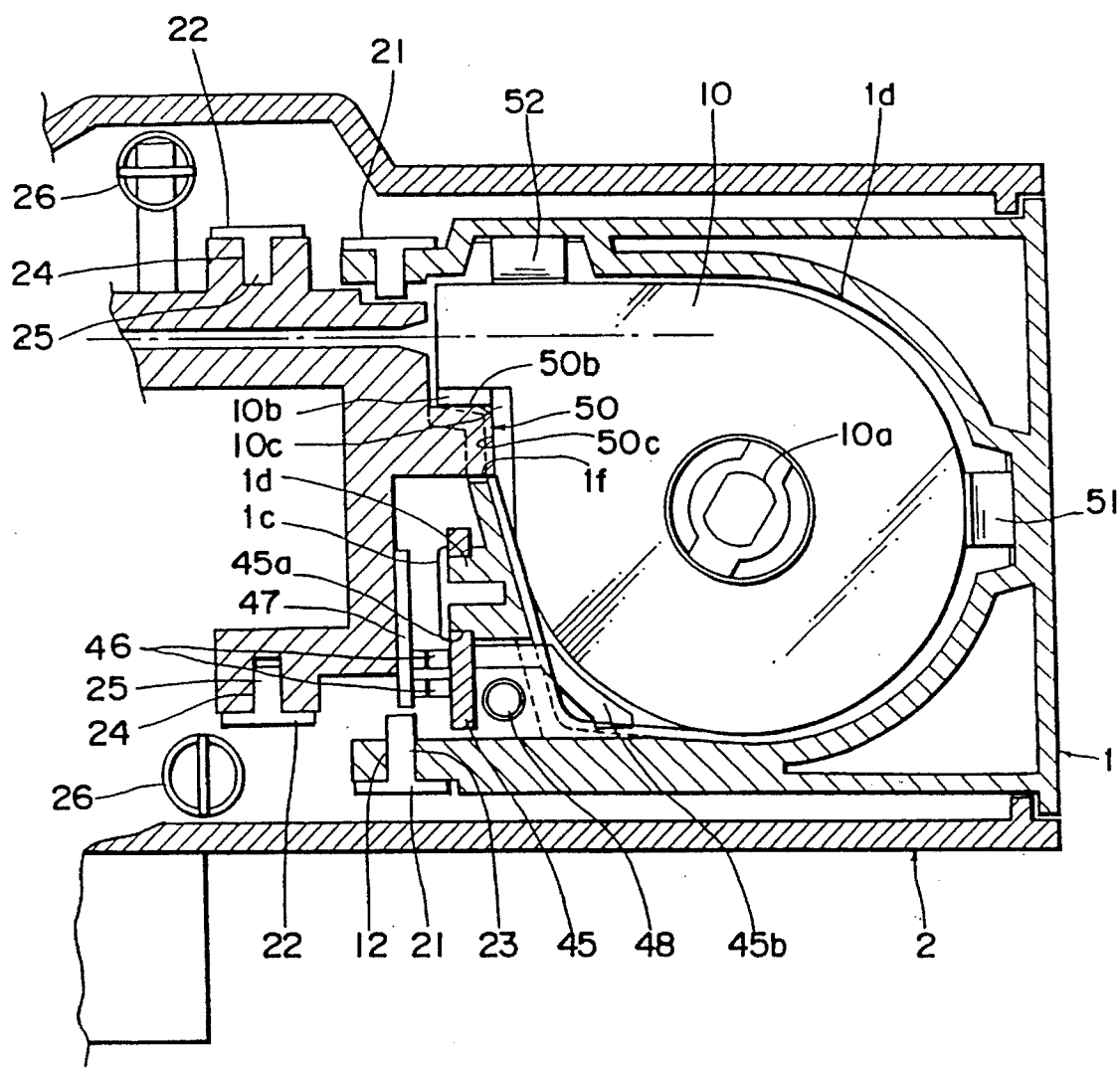
FIG. 9 is a transverse sectional view showing the cartridge loaded into the cartridge chamber casing in the condition in which the cartridge chamber casing is accommodated in the camera body.
Figure 10:
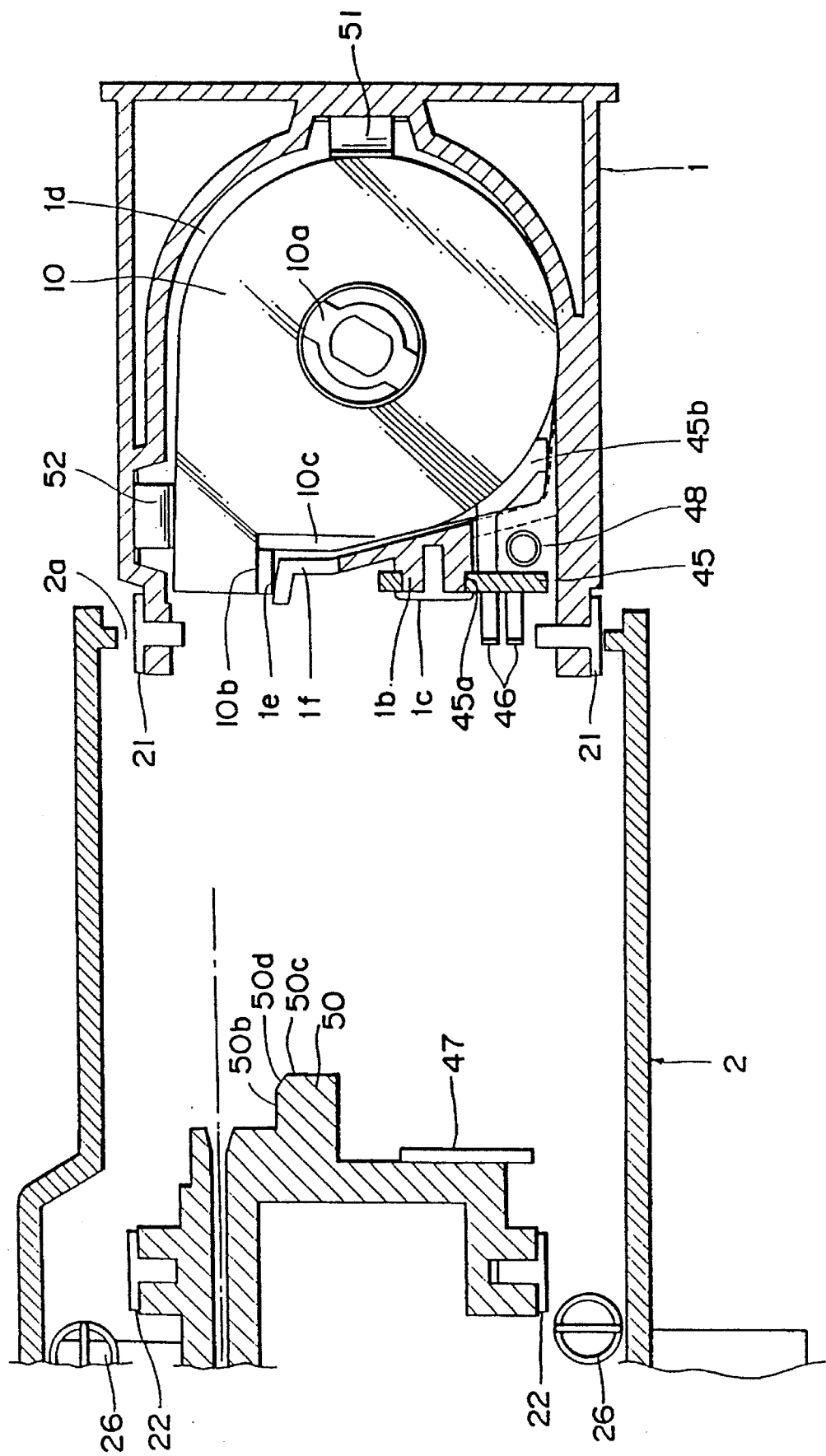
FIG. 10 is a transverse sectional view showing the cartridge loaded into the cartridge chamber casing in the condition in which the cartridge chamber casing projects from the camera body.

As shown in FIGS. 9 and 10, a rib 50 for placing the cartridge 10 in position is capable of moving into an opening if formed on the cartridge chamber casing 1 and moving out therefrom. The opening 1f is positioned on the camera body side of the cartridge chamber casing 1. When the cartridge chamber casing 1 is accommodated in the camera body 2, the leading end of the rib 50 penetrates into the cartridge accommodating portion 1d of the cartridge chamber casing 1, thus projecting from the cartridge accommodating portion 1d. The rib 50 has a first reference wall 50b having a face parallel with a direction perpendicular to the film face, a second reference wall 50c having a face parallel with the film feeding direction, and an inclined surface 50d formed between the first and second reference walls 50b and 50c. The cartridge accommodating portion 1d is a little larger than the cartridge 10 so that the rib 50 which has penetrated into the cartridge chamber casing 1 moves the cartridge 10 in the film feeding direction in some extent therein to position the cartridge 10.

A first leaf spring 51 and a second leaf spring 52 for urging the cartridge 10 accommodated in the cartridge chamber casing 1 in the film feeding direction and a direction perpendicular to the film feeding direction, respectively are provided in the cartridge chamber casing 1. When the cartridge chamber casing 1 projects from the camera body 2, the first and second leaf springs 51 and 52 press the cartridge 10 toward the wall opposed to the first leaf spring 51 and the wall opposed to the second leaf spring 52, respectively. In this condition, the first reference faces 10b of the cartridge 10 contact the inclined surfaces 1e of the cartridge chamber casing 1 while the second reference faces 10c of the cartridge 10 do not contact any internal surface of the cartridge chamber casing 1. When the cartridge chamber casing 1 is accommodated in the camera body 2, the first reference wall 50b of the rib 50 is brought into contact with the first reference faces 10b of the cartridge 10 by the urging force of the first leaf spring 51 and the second reference wall 50c of the rib 50 is brought into contact with the second reference faces 10c of the cartridge 10 by the urging force of the second leaf spring 52. When the rib 50 penetrates into the opening 1f, the inclined face 50d of the rib 50 has a function of guiding the corner of the first reference faces 10b to the first reference wall 50b of the rib 50.

The inclined surface 1e opposed to the second leaf spring 52 in the vicinity of the film passing slit of the cartridge 10 makes a certain angle with the film surface. Therefore, the cartridge 10 is held in the cartridge accommodating portion 1d with a certain angle rotated therein by the inclined face 1e when the cartridge chamber casing 1 is at the projection condition. When the cartridge 10 is loaded into the cartridge chamber casing 1, the cartridge 10 is positioned as follows: That is, a third leaf spring 53, of the camera body 2, opposed to the upper surface of the cartridge chamber casing 1 presses the cartridge 10 toward the bottom surface of the cartridge chamber casing 1. As a result, the third reference face 10d of the cartridge 10 is brought into contact with the bottom surface of the cartridge chamber casing 1. Referring to FIGS. 5 and 6, both ends of the third leaf spring 53 projects into the camera body 2 but does not project into the travel path of the cartridge chamber casing 1. Therefore, the third leaf spring 53 does not prevent the movement of the cartridge chamber casing 1.

Referring to FIG. 1, the operation of the camera is described below. Upon sliding of the ejecting button 9 with the cartridge chamber casing 1 accommodated in the camera body 2, the releasing levers 27 moves. As a result, the linking mechanism 20 is released from the locking levers 13 and the first levers 21 of the linking mechanism 20 rotate counterclockwise and the second levers 22 thereof rotate clockwise by the urging force of the springs 26. Consequently, the cartridge chamber casing 1 projects from the camera body 2 as shown in FIG. 2. The cartridge 10 is dropped into the cartridge accommodating portion 1d in this condition. If the fork 30 does not engage the spool 10a appropriately, the fork 30 moves downward against the urging force of the spring 32. When the fork driving gear 31 is driven thereafter, the fork 30 rotates, thus appropriately engaging the spool 10a. When the linking mechanism 20 is locked by the locking lever 13 as a result of a manual pressing of the cartridge chamber casing 1 toward the camera body 2 after the cartridge 10 is loaded into the cartridge accommodating portion 1d, the cartridge chamber casing 1 is accommodated in the camera body 2. If, at this time, the driving gear 34 of the camera body 2 does not appropriately engage the planetary gear 33 positioned below the cartridge chamber casing 1, the planetary gear 33 moves away from the driving gear 34 against the urging force of the spring 36. When the driving gear 34 starts rotating, the driving gear 34 engages the planetary gear 33 appropriately by the urging force of the spring 32.

When the cartridge chamber casing 1 is accommodated in the camera body 2, the rib 50 of the camera body 2 penetrates into the opening if of the cartridge chamber casing 1, thus projecting into the cartridge chamber casing 1. As a result, the first reference wall 50b parallel with the film feeding direction contacts the first reference faces 10b of the cartridge 10 by the urging force of the first leaf spring 51 and the second reference wall 50c perpendicular to the film feeding direction contacts the second reference faces 10c thereof by the urging force of the second leaf spring 52. As a result, the cartridge 10 is placed in position and held in the film feeding direction and the direction perpendicular to the film feeding direction, respectively in the cartridge chamber casing 1.

According to the above-described embodiment, when the cartridge chamber casing 1 is driven to the outside by the linking mechanism 20 and projects from the camera body 2, the cartridge 10 is loaded into the cartridge chamber casing 1, and then, when the cartridge chamber casing 1 is accommodated in the camera body 2, the first and second reference walls 50b and 50c parallel with the film feeding direction and the direction perpendicular to the film feeding direction, respectively penetrate into the cartridge chamber casing 1 from the opening 1f of the cartridge chamber casing 1. As a result, the side surfaces of the cartridge 10 accommodated in the cartridge chamber casing 1, namely, the first reference faces 10b and second reference faces 10c are brought into contact with the first and second reference walls 50b and 50c, respectively by the first and second leaf springs 51 and 52. Thus, the cartridge 10 is placed in position in the cartridge chamber casing 1. That is, the resultant force of the first and second leaf springs 51 and 52 press the first reference faces 10b and second reference faces 10c against the first and second reference walls 50b and 50c of the rib 50, respectively in approximately an equal force and further, the positions of the first reference faces 10b and the second reference faces 10c are positioned in the vicinity of the film passing slit 10e. Therefore, even though torque for rotating the cartridge 10 is generated, the dislocation of the film passing slit 10e can be restrained to an allowable extent. Accordingly, the cartridge 10 can be placed in position with an improved accuracy when the cartridge chamber casing 1 is accommodated in the camera body 2. In addition, even though force is applied from the exterior to the cartridge chamber casing 1, the cartridge 10 is placed in position in the cartridge chamber casing 1 by the first and second reference walls 50b, 50c and the first and second leaf springs 51 and 52. Therefore, the film can be held at a predetermined position.

According to the embodiment, the releasing lever 27 is operated by the ejecting button 9. As a result, the cartridge chamber casing 1 is released from the camera body 2 and the cartridge chamber casing 1 can be projected from the side of the camera body 2 by the urging force of the spring 26. Accordingly, the cartridge chamber casing 1 can be projected from the camera body 2 to a great extent, i.e., the cartridge chamber casing 1, namely, the cartridge loading opening can be noticed easily by a photographer.

Since the cartridge chamber casing 1 can be ejected from the camera body 2 by the linking mechanism 20, the camera can be miniaturized. In addition, it is not difficult to put in the cartridge into the cartridge chamber casing or take it out therefrom and mount camera parts on the upper portion because the cartridge chamber casing 1 projects from the side of the camera body 2, i.e., the opening of the cartridge chamber casing 1 is not formed on the upper surface or the lower surface thereof.

Even though the planetary gear 33 of the cartridge chamber casing 1 does not engage the driving gear 34 of the camera body 2 when the cartridge chamber casing 1 is moved from the projection position to the accommodation position, the planetary gear 33 is capable of moving away from the driving gear 34 against the urging force of the spring 36. Then, the driving gear 34 is capable engaging the planetary gear 33 immediately by the urging force of the spring 36 after the driving gear 34 starts rotating. Thus, when the cartridge chamber casing 1 is accommodated in the camera body 2, the driving gear 34 is capable engaging the planetary gear 33 appropriately without applying any excessive load thereto.

The looseness absorbing member 40 winds the loosened portion of the substrate 37 around it by the urging force of the spring 39 when the cartridge chamber casing 1 is accommodated in the camera body 2. Thus, the looseness of the substrate 37 can be sufficiently absorbed by the member 40.

The present invention is not limited to the above-described embodiment, but may be embodied in various modes. For example, each of the first reference faces 10b and 10c may be formed not as a plurality of projections, but as a solid projection.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An apparatus for use with a film cartridge which accommodates a film, comprising:

a body;

a cartridge chamber capable of holding a film cartridge to be used in said apparatus and having an opening for enabling a film cartridge to be inserted therein and removed therefrom, and movable relative to said body, in a direction perpendicular to a film feeding shaft of a film cartridge accomodated in said cartridge chamber, between a first position in which said opening is exposed and said film cartridge can be removed from said apparatus and a second position in which said film cartridge can be used in said apparatus, wherein movement of said cartridge chamber to said second position causes said opening to be covered by said body; and means for shifting said cartridge chamber between said first and second positions.

2. An apparatus as claimed in claim 1, further comprising first urging means for urging said cartridge chamber towards said first position from said second position.

3. An apparatus as claimed in claim 2, further comprising means for locking said cartridge chamber in said second position against the operation of said first urging means.

4. An apparatus as claimed in claim 1, further comprising means for generating a driving force, and means for driving said film feeding shaft of said film cartridge by the driving force generated by said generating means.

5. An apparatus as claimed in claim 4, wherein said driving means includes a film feeding member provided in said cartridge chamber, and engageable with said film feeding shaft of said film cartridge.

6. An apparatus as claimed in claim 5, wherein said driving means further includes a planetary gear capable of being revolved around a predetermined axis provided in said body for transmitting the driving force generated by said generating means to said film feeding member provided in said cartridge chamber, said planetary gear being switchable between a first condition in which said planetary gear is engaged with said generating means and a second condition in which said planetary gear is free from said generating means, and second urging means for urging said planetary gear towards said first condition.

7. An apparatus as claimed in claim 1, further comprising means for determining a position of said film cartridge with respect to said body when said cartridge chamber is located at said second position.

8. An apparatus as claimed in claim 7, wherein said determining means includes a wall arrangement provided in said body, and third urging means for urging said film cartridge against said wall arrangement to determine the position of said film cartridge with respect to said body.

9. An apparatus as claimed in claim 8, wherein said wall arrangement includes a first wall disposed along a film feeding direction and a second wall disposed along a direction perpendicular to a predetermined film plane, and wherein said third urging means includes a first urging member for urging said film cartridge against said first wall and a second urging member for urging said film cartridge against said second wall.

10. An apparatus as claimed in claim 8, wherein said third urging means is provided in said cartridge chamber.

11. An apparatus as claimed in claim 8, wherein said cartridge chamber has an opening for enabling said film cartridge to contact said wall arrangement.

12. An apparatus as claimed in claim 1, further comprising means for exposing said film to incident light which enters said body; and flash means, having a flashlight emitting portion, for illuminating an object to be photographed by a flash of light which forms said incident light, and wherein said second position of said cartridge chamber is disposed below said flashlight emitting portion.

13. An apparatus for use with a film cartridge of the type which includes a cartridge drum having an outlet through which film is fed out of the cartridge and a shaft rotatably disposed within the drum, around which a film is wound, comprising:

a body;

a cartridge chamber capable of holding a film cartridge to be used in said apparatus, and movable between a first position in which said film cartridge can be removed from said apparatus and a second position in which said film cartridge can be used in said apparatus;

a shifting device which shifts said cartridge chamber between said first and second positions; and a positioning member mounted in said body which positions a film cartridge drum against said body, relative to a direction of rotation of a film cartridge shaft, by direct contact with a film cartridge in said cartridge chamber, at a location closer to the outlet of the film cartridge than to the film cartridge shaft, when said cartridge chamber is located at said second position, the location of said positioning member relative to said body being independent of movement of said cartridge chamber.

14. An apparatus as claimed in claim 13, wherein said positioning member includes a wall arrangement provided in said body, and means for urging said film cartridge against said wall arrangement to determine the position of said film cartridge with respect to said body.

15. An apparatus as claimed in claim 14, wherein said wall arrangement includes a first wall disposed along a film feeding direction and a second wall disposed along a direction perpendicular to a predetermined film plane, and wherein said urging means includes a first urging member for urging said film cartridge against said first wall and a second urging member for urging said film cartridge against said second wall.

16. An apparatus as claimed in claim 14, wherein said urging means is provided in said cartridge chamber.

17. An apparatus as claimed in claim 14, wherein said cartridge chamber has an opening for enabling said film cartridge to contact said wall arrangement.

18. The apparatus of claim 13, wherein said positioning means comes into contact with the film cartridge as said cartridge is shifted from said first position to said second position.

19. The apparatus of claim 13, wherein said body includes a gate assembly through which film from a film cartridge is fed, and said positioning member positions a film cartridge so that said outlet faces said gate assembly.

20. The apparatus of claim 13, wherein said positioning member is stationary relative to said body.

21. An apparatus for use with a film cartridge of the type which includes a cartridge drum having an outlet through which film is fed out of the cartridge and a shaft rotatably disposed within the drum, around which a film is wound, comprising:

a body;

a cartridge chamber capable of holding a film cartridge to be used in said apparatus, and movable between a first position in which said film cartridge can be removed from said apparatus and a second position in which said film cartridge can be used in said apparatus;

a shifting device for shifting said cartridge chamber between said first and second positions;

a rewinding fork for rewinding film in the film cartridge, said fork engaging a shaft of a cartridge disposed in said chamber; and a positioning member in said body that is different from said rewinding fork, which positions a film cartridge drum against said body, relative to a direction of rotation of a film cartridge shaft, by direct contact with a film cartridge in said cartridge chamber, at a location closer to the outlet of the film cartridge than to the film cartridge shaft, when said cartridge chamber is located at said second position, the location of said positioning member relative to said body being independent of movement of said cartridge chamber.

* * * * *